(12) United States Patent
Katusic et al.

(10) Patent No.: US 7,264,787 B2
(45) Date of Patent: Sep. 4, 2007

(54) CERIUM OXIDE POWDER

(75) Inventors: Stipan Katusic, Kelkheim (DE); Stefan Heberer, Gelnhausen (DE); Michael Kraemer, Schoeneck-Kilianstaedten (DE); Peter Kress, Karlstein (DE); Michael Kroell, Kahl (DE); Edwin Staab, Geiselbach (DE)

(73) Assignee: Degussa AG, Duesseldorf (DE)

( * ) Notice: Subject to any disclaimer, the term of this patent is extended or adjusted under 35 U.S.C. 154(b) by 146 days.

(21) Appl. No.: 10/887,819

(22) Filed: Jul. 12, 2004

(65) Prior Publication Data
US 2005/0036928 A1   Feb. 17, 2005

(30) Foreign Application Priority Data
Aug. 13, 2003   (DE) ............... 103 37 199

(51) Int. Cl.
*B24B 1/00*   (2006.01)
*C01F 1/00*   (2006.01)
*C01F 17/00*   (2006.01)
*C09G 1/18*   (2006.01)

(52) U.S. Cl. ............ 423/263; 204/157.42; 51/307; 51/309; 106/3; 524/492; 524/493; 977/773; 977/775; 977/811

(58) Field of Classification Search ........... 423/263; 204/157.42; 51/307, 309; 106/3; 524/492, 524/493; 977/773, 775, 811

See application file for complete search history.

(56) References Cited

U.S. PATENT DOCUMENTS

| | | | |
|---|---|---|---|
| 4,918,126 A * | 4/1990 | Matsushita et al. | 524/188 |
| 5,064,628 A | 11/1991 | Chane-Ching et al. | |
| 6,420,269 B2 | 7/2002 | Matsuzawa et al. | |
| 6,887,566 B1 * | 5/2005 | Hung et al. | 428/357 |
| 6,946,009 B2 * | 9/2005 | Ito et al. | 51/307 |
| 7,025,943 B2 * | 4/2006 | Zhou et al. | 423/263 |
| 2005/0036928 A1 | 2/2005 | Katusic et al. | |
| 2005/0074610 A1 | 4/2005 | Kroll et al. | |
| 2007/0048205 A1 | 3/2007 | Katusic et al. | |

FOREIGN PATENT DOCUMENTS

| | | |
|---|---|---|
| EP | 1 234 801 A2 | 8/2002 |
| JP | 11-330015 | 11/1999 |
| WO | WO97/43087 | 11/1997 |
| WO | WO 01/36332 | 5/2001 |

OTHER PUBLICATIONS

Patent Abstracts of Japan, JP 11-198045, Jul. 27, 1999.
Pedro Duran, et al., "Cerium (IV) oxide synthesis and sinterable powders prepared by the polymeric organic complex solution method", Journal of the European Ceramic Society, vol. 22, No. 9-10, XP-004350849, Sep. 2002, pp. 1711-1721.

* cited by examiner

*Primary Examiner*—Timothy C. Vanoy
(74) *Attorney, Agent, or Firm*—Oblon, Spivak, McClelland, Maier & Neustadt, P.C.

(57) ABSTRACT

Polycrystalline cerium oxide powder in the form of aggregates of primary particles with a specific surface of between 70 and 150 m$^2$/g, an average primary particle diameter of between 5 and 20 nm and an average, projected aggregate diameter of between 20 and 100 nm. It is produced in that an aerosol is reacted in a flame obtained from a hydrogen-containing combustible gas and primary air and the solid obtained is then separated from the gaseous substances.

41 Claims, 4 Drawing Sheets

CERIUM OXIDE POWDER

BACKGROUND OF THE INVENTION

1. Field of the Invention

The present invention provides a cerium oxide powder, a method for producing the powder, and the use thereof.

2. Description of the Background

Owing to its extraordinary properties as an abrasive and catalyst material, there are numerous patent applications and journal articles on the production of cerium oxide powders. Cerium oxide is generally produced by the calcination of cerium hydroxides or cerium carbonates. The calcined oxides are then ground and sieved. Another way of synthesising cerium oxide consists in hydrothermal synthesis, as described e.g. in U.S. Pat. No. 5,389,352. Here, cerium(III) salts are converted oxidatively, under the influence of temperature and pressure, to cerium oxide, which crystallises out in the form of fine particles. Of particular interest are spray pyrolysis methods, in which a cerium oxide precursor, generally in the form of an aerosol, is oxidised in a flame. A method of this type is described e.g. in EP-A-1142830.

Pratsinis et al. in J. Mater. Res., vol. 17, pages 1356-1362 (2002), describe the production of cerium oxide powder of high crystallinity by flame spray pyrolysis of cerium acetate solutions in solvent mixtures of acetic acid, iso-octane and 2-butanol by oxidation using oxygen in an oxygen/methane flame. The solvent mixture is essential for the production of a cerium oxide powder that is free from, or substantially free from, coarser particles. Acetic acid alone leads to powders with a coarse portion. Particularly advantageous in achieving a fine particle size powder that is free from coarse portions is an increase in the cerium oxide precursor flow rate and a reduction in the oxygen flow. The average particle size is derived from the XRD spectrum. Especially the feed of iso-octane, with its high combustion enthalpy and a high evaporation/combustion rate, is said to reduce the proportion of coarser particles. It is stated that the specific surface of the cerium oxide particles, which can be between 101 and 240 $m^2/g$, can be altered by varying the ratio of cerium oxide precursor and oxygen. An increase in the precursor feed rate with constant oxygen flow is said to lead to an increase in the particle size, an increase in the oxygen flow with constant precursor feed rate to a reduction in the particle size.

Only an average primary particle size can be taken from the document. No information is given as to how these are distributed. From the TEM photograph on page 1357 it can be seen that the primary particles of the fine portion have fused together into aggregates, which have a high degree of aggregation. It is known to the person skilled in the art that precisely aggregates of this type can be dispersed only with difficulty. Especially when the cerium oxide is used as an abrasive in dispersions, this can lead to scratches on the surface to be polished and to uneven removal. In addition, dispersions containing cerium oxide particles of this type often exhibit only low stability with respect to sedimentation.

The pore sizes and their distribution are an important feature when cerium oxide powders are used in catalytic processes. The cerium oxide powder produced by Pratsinis et. al. has a bimodal pore size distribution, wherein 10% of the pores are smaller than 10 nm.

Furthermore, the process described only enables small quantities of cerium oxide (range approx. 10 g/h) to be produced and is thus not very economical. No options are given for scaling up the process. Furthermore, the use of methane and iso-octane as combustible gas leads to a high proportion of carbon in the reaction mixture. Thus, the risk of cerium oxide being contaminated with carbon is also increased.

U.S. Pat. No. 5,772,780 claims a dispersion containing cerium oxide for the polishing of semiconductor substrates, wherein the cerium oxide is present in the form of aggregated crystalline particles with a crystallite size of no more than 30 nm. No production process for the cerium oxide particles and the cerium oxide-containing dispersion is disclosed.

U.S. Pat. No. 6,420,269 claims an abrasive containing a cerium oxide grain, which is obtained by oxidation of a water-insoluble, trivalent cerium salt dispersed in water. The cerium oxide has a specific surface of between 50 and 500 $m^2/g$ and a density of 0.8-1.3 g/ml. The size of the cerium oxide primary grain is no more than 10 nm, the size of the cerium oxide secondary grain, which is formed by aggregation from the primary grains, is less than 1 µm. The secondary grains have a perimeter that is free from edges and has an angle of less than 120°. The cerium oxide grain has a main signal in the X-ray powder diffractogram with a half width of no less than 0.4° and no more than 0.5°. In addition, it is an essential feature that the material is not completely crystallised. This is said to display advantages in the polishing of semiconductor substrates.

U.S. Pat. No. 6,221,118 claims a dispersion containing cerium oxide particles of low crystallinity, which consists of primary particles with an average diameter of 30 to 250 nm. The cerium oxide particles in the dispersion have an average diameter of 150 to 600 nm. The cerium oxide particles are obtained by combustion of cerium carbonate.

In the German patent application number DE 10251029.6 of 02.11.2002, a pyrogenically produced cerium oxide powder with a specific surface of 15 to 200 $m^2/g$ is claimed, which consists of a coarse portion of crystalline, non-aggregated particles with an average diameter of between 30 and 200 nm and of a fine portion in the form of aggregates of fine crystalline, fused primary particles with an average aggregate diameter of 5 to 50 nm. It is produced in that at least one compound capable of being converted into cerium oxide by oxidation is fed into a flame, which is produced from a hydrogen-containing combustible gas, preferably hydrogen, and an excess of air or an air/oxygen mixture, and is reacted there. The discharge velocity of the fluid droplets from the atomizer unit into the reaction chamber is greater than 70 m/s here and the velocity of the reaction mixture in the reaction chamber is between 0.5 and 2 m/s. The flame has an oxygen excess, expressed as a lambda value, of at least 1.6.

From WO 01/36332 the production of cerium oxide particles is known. The cerium oxide particles are produced in a high-temperature reaction zone, generally a flame, by oxidation of cerium salt solutions, which are fed into the reaction zone in the form of fine droplets. In this way, aggregates are obtained which consist substantially of approximately spherical primary particles. At least some of these aggregates have a cenospherical structure with an aggregate size of 1 to 20 µm. In addition, the cerium oxide composition may also contain aciniform (grape-like) aggregates with an average aggregate diameter of less than 500 nm. A cerium oxide composition in which the cenospherical aggregates predominate is preferred. A disadvantage of this cerium oxide composition is that the cenospherical aggregates are unstable and friable, and can therefore disintegrate in an irregular manner in applications in which energy has to be applied, e.g. shear energy, during incorporation into dispersions. Furthermore, the fragments obtained after dispersion can lead to an undesirable, non-uniform, unpredictable particle size distribution in the dispersion.

On the one hand, there remains a keen interest in cerium oxide, and on the other hand it becomes clear that even small changes in the way in which the reaction is conducted lead to a material with different properties.

In particular, dispersions containing cerium oxide play an important part in the polishing of semiconductor substrates (CMP, chemical-mechanical polishing). With the increasing miniaturization of components, the polishing operation is of central importance.

SUMMARY OF THE INVENTION

An object of the invention is therefore to provide a cerium oxide powder that is suitable for the polishing of semiconductor substrates as a component of a dispersion. A further object is to provide a process for the production of cerium oxide.

Another object of the invention is to provide a cerium oxide-containing dispersion with high stability. The cerium oxide should be readily incorporated therein and should exhibit high stability with respect to sedimentation. Another object is a process for the production of this dispersion.

The present invention provides a polycrystalline cerium oxide powder in the form of aggregates of primary particles, which is characterised in that it has a specific surface of between 70 and 150 $m^2/g$, an average primary particle diameter of between 5 and 20 nm, and an average, projected aggregate diameter of between 20 and 100 nm.

BRIEF DESCRIPTION OF THE DRAWINGS

FIG. 4 illustrates this fact using the example of a cerium oxide powder according to the invention to aid understanding.

DETAILED DESCRIPTION OF THE INVENTION

As used herein, the term "polycrystalline" means that the primary particles are crystalline and fused into aggregates. The term "primary particles" means particles that are initially formed in the reaction and fuse together to form aggregates as the reaction progresses. The term "aggregate" means primary particles of similar structure and size that have fused together, the surface of which is smaller than the sum of the individual, isolated primary particles.

Figure 1:
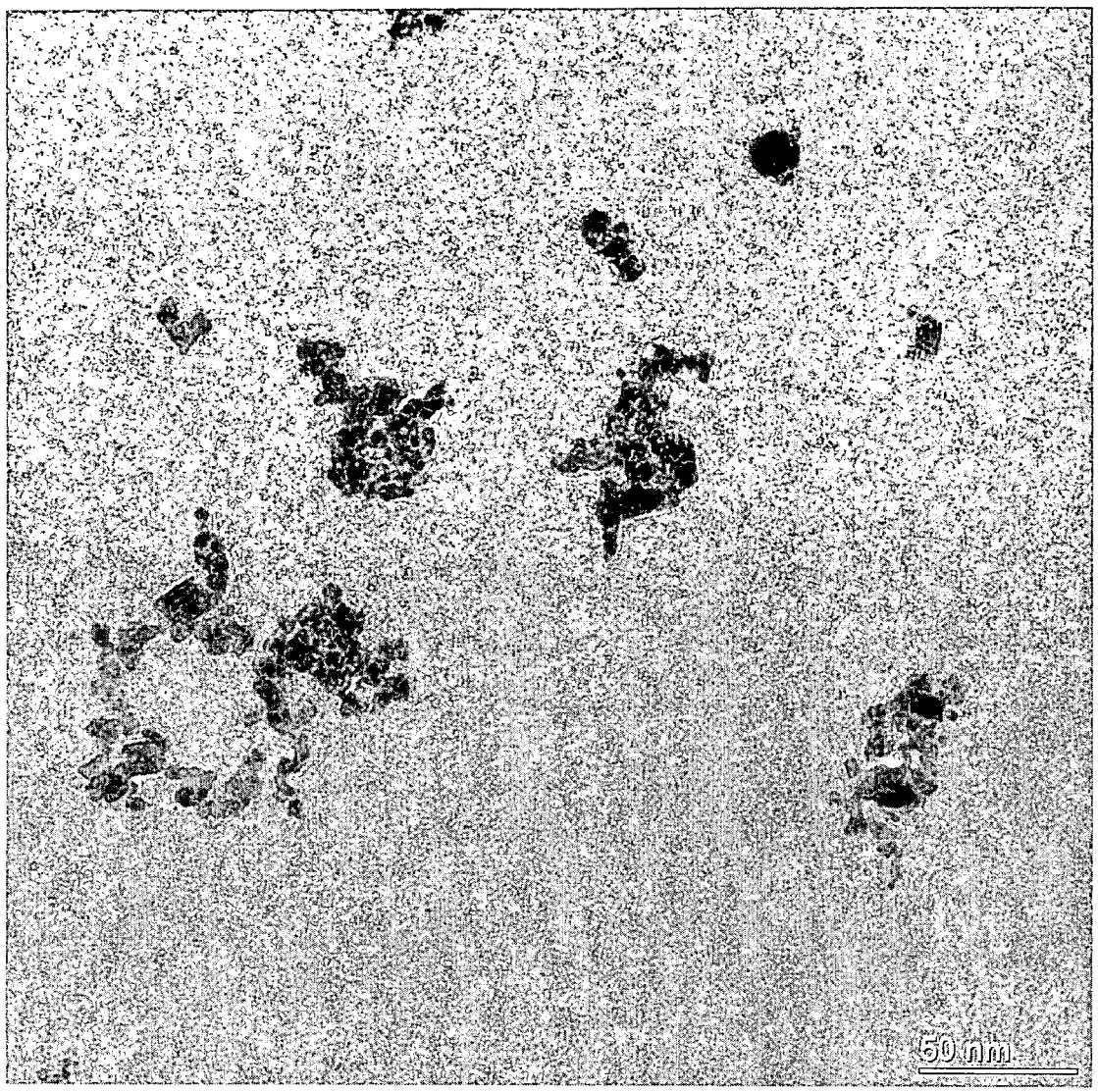
FIG. 1: a TEM photograph of a cerium oxide powder according to the invention.

The average primary particle diameter and the average projected aggregate diameter (ECD; Equivalent Circle Diameter) are obtained by image analysis of TEM photographs. Both sizes are defined as number-based within the meaning of the application. FIG. 1 shows a TEM photograph of a cerium oxide powder according to the invention.

A powder with a specific surface of between 90 and 120 $m^2/g$ may be preferred.

The average primary particle diameter can be between 8 and 15 nm and the average projected aggregate diameter between 30 and 70 nm.

Figure 2:
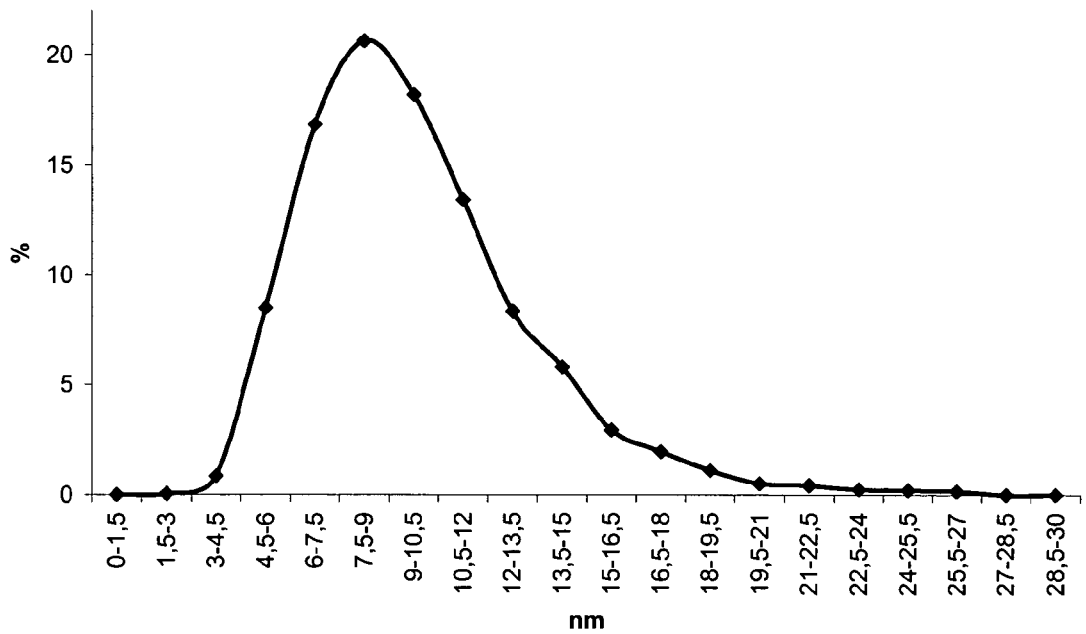
FIG. 2: a distribution of the primary particle diameters of a cerium oxide powder according to the invention

For subsequent use in dispersions, it has proved advantageous for the primary particle diameters to have a narrow distribution. This means that, for an average value m of the diameter, at least 68% of the particles are in the range of 0.6 m to 1.4 m or 95% of the particles are in the range of 0.2 m to 1.8 m. For an average primary particle diameter of 10 nm, this means that at least 68% of the particles are in a range of between 6 and 14 nm, or 95% of the particles are in a range of between 2 and 18 nm. FIG. 2 shows a distribution of the primary particle diameters of a cerium oxide powder according to the invention.

Figure 3:
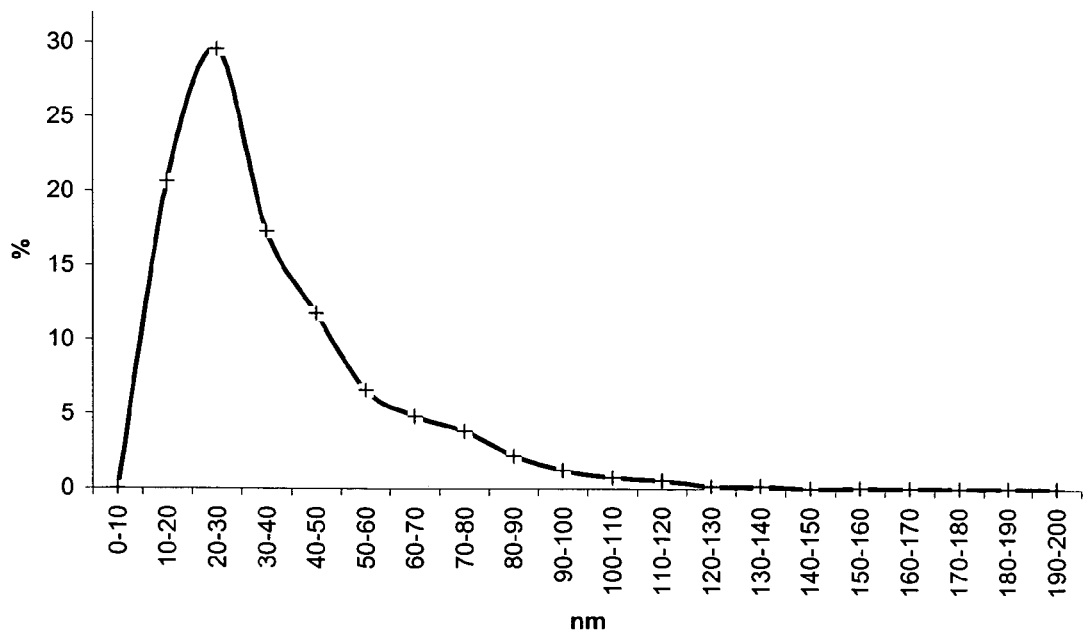
FIG. 3: a distribution of the projected aggregate diameters of a cerium oxide powder according to the invention.

Similarly, it is advantageous if the aggregate diameters have a narrow distribution. This means that, for an average value m of the projected aggregate diameter, at least 68% of the projected aggregate diameters are in the range of 0.6 m to 1.4 m or 95% of the particles are in the range of 0.2 m to 1.8 m. For an average, projected aggregate diameter of 40 nm this means that at least 68% of the particles are in a range of between 24 and 56 nm, or 95% of the particles are in a range of between 8 and 72 nm. FIG. 3 shows a distribution of the projected aggregate diameters of a cerium oxide powder according to the invention.

Preferably at least 70%, particularly preferably at least 80% of the aggregates of the cerium oxide powder according to the invention can have an area of less than 1500 $nm^2$.

It is also preferred that at least 85%, particularly preferably at least 90%, of the aggregates of the cerium oxide powders according to the invention have an area of less than 4500 $nm^2$.

In another embodiment, the cerium oxide powder according to the invention can have a composition CeOx with x=1.5<x<2 on the surface, wherein the range $1.7 \leq x \leq 1.9$ may be particularly preferred. This means that areas of cerium(III) oxide ($Ce_2O_3$) and cerium(IV) oxide ($CeO_2$) are present on the surface. This composition may be important particularly in the field of catalysis (oxygen storage, oxygen generation).

The cerium oxide powder according to the invention can have a total sodium content of less than 500 ppm, particularly preferably of less than 100 ppm, especially preferably less than 30 ppm. The sodium content is critical for many applications, particularly in the semiconductor industry.

In a particular form, the cerium oxide powder according to the invention can have less than 10 ppm on the surface and on layers of the particles close to the surface. This can be determined e.g. by large-area (1 $cm^2$) XPS analysis (XPS=X-ray induced photoelectron spectroscopy). A layer close to the surface means a surface produced by ion bombardment (5 keV argon ions).

In addition, the cerium oxide powder according to the invention can have a carbon content of less than 0.1 wt. %, particularly preferably of less than 0.05 wt. %. Sources of carbon are mainly organic cerium oxide precursors and organic solvents.

In one embodiment, the cerium oxide powder according to the invention is free from micropores with a pore diameter of less than 2 nm, determined by t-plot according to de Boer. The volume of the mesopores with a diameter of between 2 and 50 nm in the cerium oxide powder according to the invention can be between 0.40 and 0.60 ml/g, particularly preferably between 0.45 and 0.55 ml/g.

Figure 4:
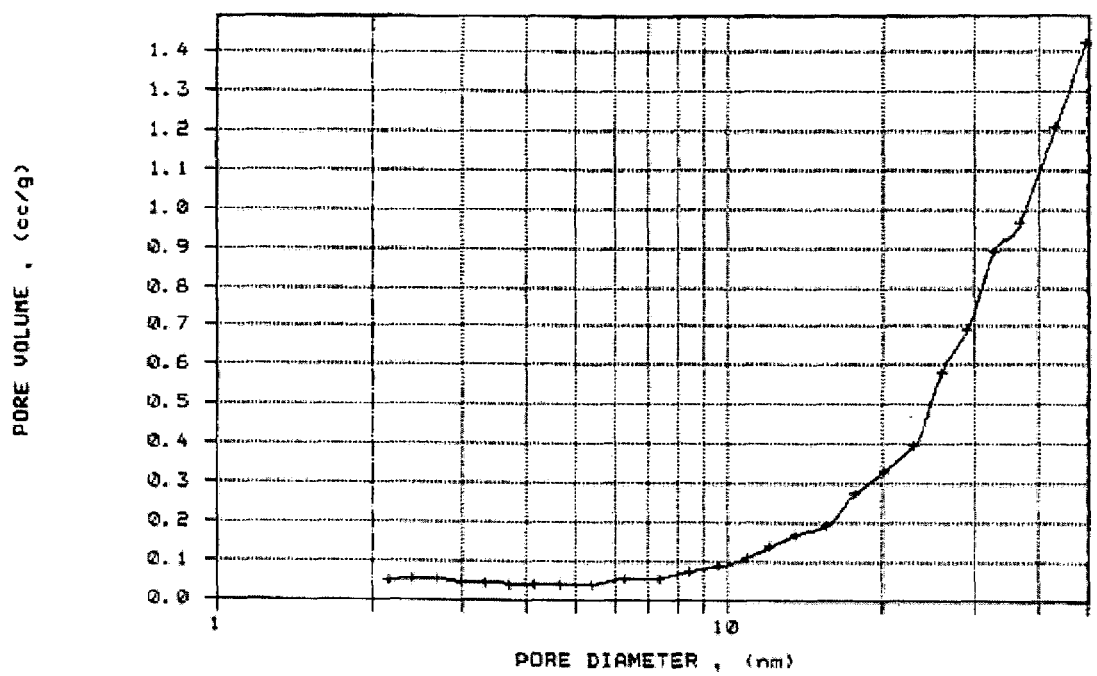
FIG. 4: a plot of the pore volume is plotted against the pore diameter.

The mesopores in the cerium oxide powder according to the invention preferably exhibit a monomodal size distribution. This means that, when the pore volume is plotted against the pore diameter, no marked maximum (point without slope) occurs in the range between 2 and 50 nm. The pore volume thus increases constantly with the pore diameter. FIG. 4 illustrates this fact using the example of a cerium oxide powder according to the invention to aid understanding.

The invention further provides a process for the production of the cerium oxide powder according to the invention, which is characterised in that an aerosol is reacted in a flame burning in a reaction chamber and the solid obtained is then separated from the gaseous substances, wherein the aerosol is produced from an atomizer gas, preferably air, and a solution containing between 2 and 40 wt. % of a cerium compound that can be converted to cerium oxide by oxidation, the flame is obtained from a hydrogen-containing combustible gas and primary air, which can be air itself or an air/oxygen mixture, at least the same quantity of secondary air as primary air is introduced into the reaction chamber, for lambda, it is true that $1.1 \leq \text{lambda} \leq 1.5$, with lambda being calculated from the quotient of the sum of the proportion of oxygen in the primary air, the secondary air and the atomizer gas, if it contains oxygen, divided by the sum of the cerium compound to be oxidised and the hydrogen-containing combustible gas, each in mol/h, the discharge velocity of the liquid droplets from the atomizer unit into the reaction chamber is greater than 500 m/s, and the velocity of the reaction mixture in the reaction chamber is greater than 2 m/s.

The cerium oxide powder according to the invention is obtained by a combination of the above-mentioned features. If individual features lie outside the limits claimed, this leads to a cerium oxide powder with an unfavorable, large aggregate diameter and/or to the formation of a coarse portion. A composition of this type cannot be tolerated e.g. when the cerium oxide powder is to be used as an abrasive in the semiconductor industry.

The proportion of the cerium compound in the solution is between 2 and 40 wt. % in the process according to the invention. Lower values make no sense economically, and with higher values there can be problems with the solubility. It can be advantageous to select a proportion of the cerium compound in the solution of between 5 and 25 wt. %.

The nature of the solvent, whether aqueous, organic or aqueous-organic, is not limited in the process according to the invention. It is dependent on the solubility of the cerium compounds used. However, it may be advantageous to use an organic solvent or mixtures of organic solvents with water. For example, alcohols such as ethanol, propanols or butanols or carboxylic acids such as acetic acid, propionic acid, 2-ethylhexanoic acid can be used. Halogen-containing solvents can also be used, but they mean that product purification steps are additionally necessary and so they are less advantageous.

The nature of the cerium compounds used in the process according to the invention is not limited. Organic cerium compounds can preferably be used. These can be, for example, cerium alkoxides, such as cerium isopropylate, cerium acetate, cerium acetylacetonate, cerium oxalate, cerium 2-ethylhexanoate and mixtures of the above. Cerium 2-ethylhexanoate can particularly preferably be used.

The solution can be fed in under a pressure of 1 to 1000 bar, preferably between 2 and 100 bar.

The atomization of these solutions can be performed e.g. by ultrasonic atomizer or at least one multi-substance nozzle. The multi-substance nozzle can be used at pressures of up to 100 bar. When a multi-substance nozzle is used, there is the advantage that the droplets can be produced with a gas jet. If this gas jet contains oxygen, a very intensive premixing of the oxidising agent with the cerium-containing compound can be achieved. A mist eliminator can advantageously be connected downstream.

An essential feature of the process according to the invention is the maintaining of the factor lambda, which, in the process according to the invention, is between 1.1 and 1.5. Outside this range, no cerium oxide powder according to the invention is obtained. With lower lambda values, there is the risk of incomplete oxidation, and with higher lambda values, mainly powders containing a coarse portion result. A lambda value of between 1.2 and 1.5 has proved advantageous.

A coarse portion is also obtained if the discharge velocity of the liquid droplets from the atomizer unit into the reaction chamber and the velocity of the reaction mixture in the reaction chamber lie outside the claimed limits.

The term "coarse portion" as used herein refers to particles with an average diameter of more than 100 nm.

Another important feature of the process according to the invention is the quantity of secondary air introduced into the reaction chamber. This must at least correspond to the quantity of primary air to obtain the cerium oxide powder according to the invention. If smaller quantities of secondary air are fed in, an increased proportion of coarse portions must again be expected. A process in which double the quantity of primary air is fed in as secondary air has proved advantageous.

It can also be advantageous if a restrictor is provided in the reaction chamber. This can be positioned at various points in the reaction chamber. With this, the degree of mixing of the reaction components, and the velocity thereof, can be intensified. In general, a turbulent flow will be particularly preferred.

The process according to the invention can be carried out in such a way that the reaction mixture is cooled to temperatures of 100 to 200° C. after leaving the reaction chamber. This can be achieved by introducing water vapor into the reaction chamber at one or more points.

The separation of the solid from gaseous products is not limited in the process according to the invention. For example, a cyclone or a filter can be used. It has proved particularly advantageous to use a heatable filter. The temperature of this filter can preferably be between 100° C. and 200° C.

The temperature in the reaction chamber, measured 0.5 m below the flame, can preferably be between 1000° C. and 1400° C., particularly preferably between 1100° C. and 1250° C.

Figure 5:
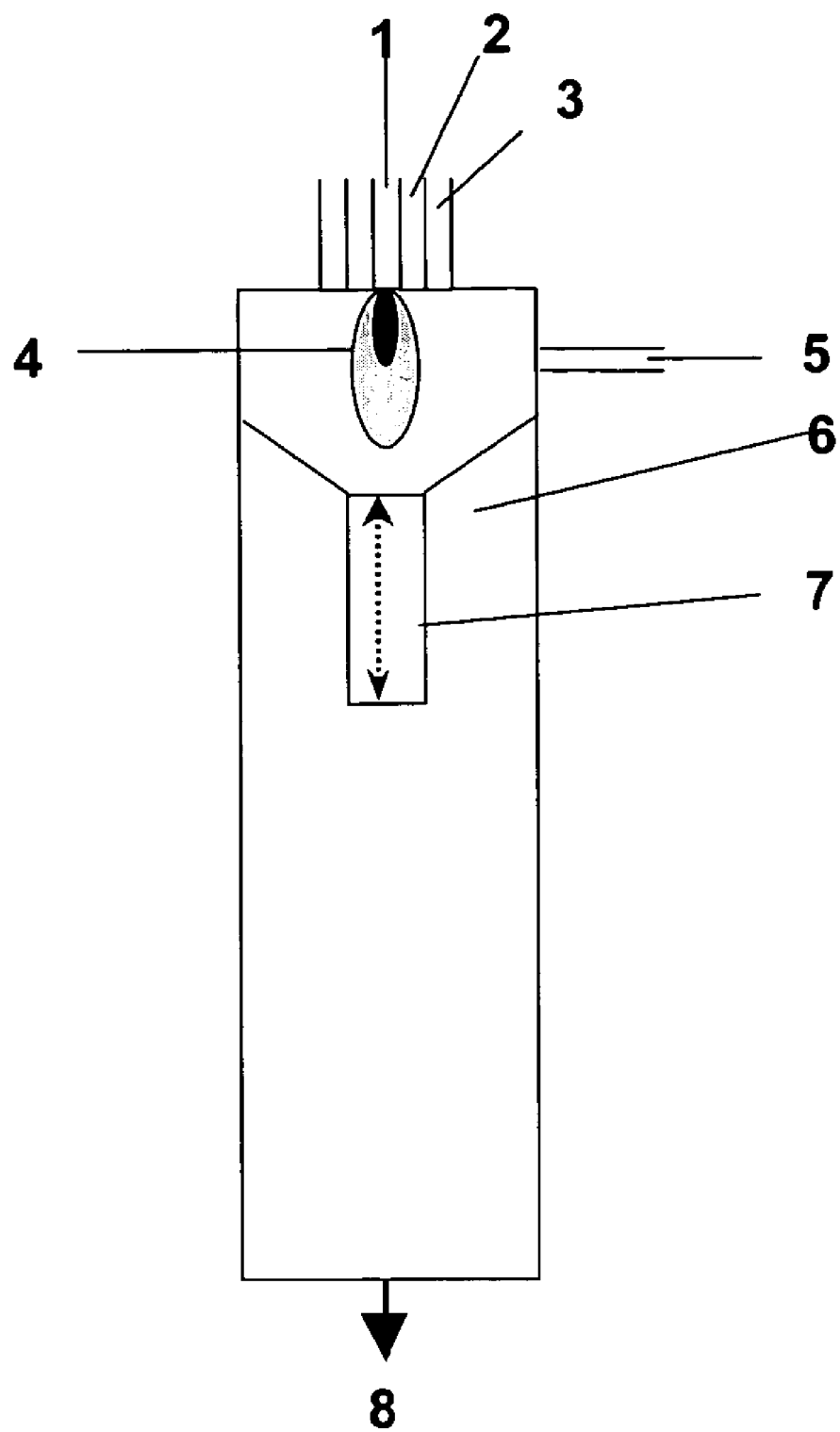
FIG. 5: a diagram of an arrangement for the production of the cerium oxide powder according to the invention. The key is as follows: 1=aerosol containing cerium oxide precursor; 2=primary air; 3=combustible gas; 4=flame; 5=secondary air; 6=reaction chamber; 7=restrictor (optional); 8=product discharge.

FIG. 5 shows a diagram of an arrangement for the production of the cerium oxide powder according to the invention. The key is as follows: 1=aerosol containing cerium oxide precursor; 2=primary air; 3=combustible gas; 4=flame; 5=secondary air; 6=reaction chamber; 7=restrictor (optional); 8=product discharge.

The cerium oxide powder according to the invention can be used as a polishing agent in the electronics industry, for the heat stabilizing of silicone rubber and as a catalyst. Such uses of cerium oxide powder are well-known in the art.

The invention also provides a dispersion containing the cerium oxide powder according to the invention.

The dispersion according to the invention can have a liquid phase that is aqueous, organic or aqueous-organic. The liquid phase can preferably be an aqueous phase.

The dispersion according to the invention preferably has an average aggregate diameter d50 in the dispersion of less than 200 nm, particularly preferably of less than 100 nm.

Preferably at least 90% of the aggregates in the dispersion according to the invention have an aggregate diameter of between 200 and 300 nm and no aggregates with an aggregate diameter of more than 500 nm.

The content of cerium oxide powder in the dispersion according to the invention is not limited. It is preferably between 2 and 20 wt. %, particularly preferably between 5 and 10 wt. %. A content of less than 2 wt. % makes no sense from an applicational and economic point of view. With contents of more than 20 wt. %, it becomes difficult to keep the dispersion stable with respect to sedimentation for a reasonable period of time.

The dispersion according to the invention can contain at least one dispersant. This can contribute to a stabilising of the dispersion.

Suitable dispersants can be: water-soluble, organic polymers, such as (meth)acrylic acid polymers and their ammonium salts, and polyvinyl alcohols; water-soluble, anionic, surface-active substances, such as ammonium lauryl sulfate and polyoxyethylene lauryl ether-ammonium sulfate; water-soluble, non-ionic, surface-active substances, such as polyoxyethylene lauryl ether, polyethylene glycol monostearate and/or water-soluble amines such as monoethanolamine and diethanolamine.

The proportion of the dispersant in the dispersion according to the invention can preferably be between 0.1 and 50 wt. %, based on the cerium oxide powder in the dispersion. Values of between 1 and 10 wt. % can be particularly preferred.

The dispersion according to the invention can preferably be alkaline. A range of between pH 8 and 12 can be particularly preferred. If a modification of the pH to higher values is desired, this can preferably be achieved with alkaline substances that do not contain a metal ion, such as e.g. sodium. Ammonium hydroxide or tetraalkylammonium hydroxides can be particularly preferred.

The invention also provides a process for the production of the dispersion according to the invention, which is characterised in that the cerium oxide powder according to the invention is pre-dispersed and then dispersed in a liquid medium, preferably aqueous, with dispersants and pH-regulating substances optionally being initially present in the liquid medium before the pre-dispersing or being added during the dispersing.

Another possibility consists in that, during the dispersing operation, cerium oxide powder and dispersant and/or pH-regulating substances are added to the liquid medium alternately.

Ultrasonic treatment or toothed disc, for example, are suitable for the pre-dispersing. Rotor-stator machines, such as Ultra Turrax (IKA) or those from Ystral, are suitable for the dispersing, as are ball mills or attrition mills. Higher energy inputs are possible with a planetary kneader/mixer. The effectiveness of this system is linked to a sufficiently high viscosity of the mixture being worked to introduce the high shear energies required to break down the particles.

In addition, high-pressure homogenizers can be used. In these devices, two pre-dispersed suspension streams under high pressure are depressurised using a nozzle. The two dispersion jets collide with each other exactly and the particles grind one another. In another embodiment, the pre-dispersion is also placed under high pressure, but the particles collide with armored wall areas. The operation can be repeated as often as desired to obtain smaller particle sizes.

The invention also provides the use of the dispersion according to the invention for the polishing of oxidic and metallic layers.

EXAMPLES

Having generally described this invention, a further understanding can be obtained by reference to certain specific examples which are provided herein for purposes of illustration only and are not intended to be limiting unless otherwise specified.

The specific surface is determined in accordance with DIN 66131, incorporated herein by reference.

The TEM photographs are obtained with a Hitachi TEM instrument, model H-75000-2. Using the CCD camera of the TEM instrument and subsequent image analysis, approx. 2000 aggregates are evaluated in each case with respect to the primary particle and aggregate diameters.

The surface properties, such as sodium content and stoichiometry of the cerium oxide powder, are determined by large-area (1 cm2) XPS analysis (XPS=X-ray induced photoelectron spectroscopy).

The stoichiometry of the cerium oxide powder here is determined on the surface in the original state based on the fine structures of the Ce 3d5/2 and 3d3/2.

The sodium content is determined both in the original state and after 30 minutes' surface erosion by ion bombardment (5 keV argon ions).

Sodium content (wet chemical): decomposition with H2SO4/HF, determination by ICPMS.

The pore size distribution is determined for micropores (<2 nm) by t-plot according to de Boer, for mesopores (2-50 nm) by the BJH method and for macropores (>50 nm) by Hg intrusion.

The dispersions are produced by ultrasonic treatment; ultrasound probe (Bandelin UW2200/DH13G), step 8, 100%; 5 minutes) in water. The average aggregate diameters d50 of the cerium oxide powders are determined with an LB-500 particle size analyzer from Horiba.

Example 1

1200 g/h of a solution of cerium(III) 2-ethylhexanoate (49 wt. %) in 2-ethylhexanoic acid (51 wt. %) are atomized through a nozzle with a diameter of 0.8 mm into a reaction chamber using air (5 m$^3$/h). Here, an oxyhydrogen gas flame consisting of hydrogen (10 m$^3$/h) and primary air (10 m$^3$/h) is burning, in which the aerosol is reacted. In addition, 20 m$^3$/h of secondary air are introduced into the reaction chamber. A restrictor with a length of 150 mm and a diameter of 15 mm, through which the reaction mixture is passed, is installed in the reaction chamber below the flame. After cooling, the cerium oxide powder is separated from gaseous substances using a filter.

Examples 2-9

Examples 2 to 9 are performed in the same way as Example 1; the quantities used and other process parameters can be taken from Table 1. In Example 5, no restrictor is employed and cerium(III) nitrate is used instead of cerium(III) 2-ethylhexanoate.

The physico-chemical data of the cerium oxide powders obtained can be taken from Table 2.

The naming of the dispersions corresponds to the relevant powders. Dispersion D1 corresponds to the powder P1 from Example 1, D2 corresponds to P2, etc.

TABLE 3

| Dispersion | | D1 | D2 | D3 | D4 |
|---|---|---|---|---|---|
| Aggregate diameters in dispersions[a] | | | | | |
| Average | nm | 156 | 147 | 114 | 130 |
| 90% less than | nm | 237 | 236 | 203 | 205 |
| 95% less than | nm | 280 | 277 | 237 | 249 |

[a] Content of cerium oxide: 2 wt. %

TABLE 1

Process parameters in the production of the cerium oxide powders $P_n$ starting from Ce(III) 2-ethylhexanoate

| Example | | Examples according to the invention | | | | Comparative examples | | | | |
|---|---|---|---|---|---|---|---|---|---|---|
| | | 1 | 2 | 3 | 4 | 5[c] | 6 | 7 | 8 | 9 |
| Cerium content | wt. % | 12 | 12 | 12 | 10 | 15 | 12 | 12 | 12 | 12 |
| Mass flow | g/h | 1200 | 1200 | 1400 | 1200 | 1300 | 1200 | 1200 | 1300 | 1500 |
| Gas volume flow | | | | | | | | | | |
| Hydrogen | m³/h | 10 | 10 | 10 | 10 | 4.44 | 10 | 7.6 | 8 | 8 |
| Primary air | m³/h | 10 | 10 | 10 | 10 | 10 | 30 | 5 | 10 | 10 |
| Secondary air | m³/h | 20 | 20 | 20 | 20 | 20 | 0 | 11 | 25 | 22 |
| Atomizer air | m³/h | 5 | 5 | 5 | 5 | 4 | 5 | 3 | 5 | 3 |
| Restrictor length | mm | 150 | 150 | 50 | 300 | — | 150 | 150 | 100 | 50 |
| Temperature 1[a] | ° C. | 1200 | 1185 | 1220 | 1150 | 751 | 1200 | 1450 | 1006 | 1200 |
| 2[b] | ° C. | 800 | 820 | 900 | 785 | 623 | 800 | 1080 | 750 | 840 |
| Lambda | | 1.47 | 1.47 | 1.47 | 1.47 | 2.82 | 1.47 | 1.05 | 2.09 | 1.47 |
| Velocity | | | | | | | | | | |
| Nozzle discharge | m/s | 741.36 | 741.36 | 741.36 | 741.36 | 259.46 | 741.36 | 99.99 | 741.36 | 99.99 |
| Reaction chamber | m/s | 2.43 | 2.43 | 2.44 | 2.38 | 0.47 | 2.43 | 0.19 | 2.43 | 0.19 |
| Residence time Reaction chamber | s | 0.8 | 0.8 | 0.8 | 0.7 | 4.2 | 0.8 | n.d. | n.d. | n.d. |

[a] Temperature 1 = 0.5 m below the flame,
[b] Temperature 2 = reactor outlet
[c] cerium(III) nitrate instead of Ce(III) 2-ethylhexanoate;

TABLE 2

Physico-chemical data of the cerium oxide powders

| Powder[a] | | Examples according to the invention | | | | Comparative examples | | | | |
|---|---|---|---|---|---|---|---|---|---|---|
| | | P1 | P2 | P3 | P4 | P5 | P6 | P7 | P8 | P9 |
| Fines/coarse portion | | 100/0 | 100/0 | 100/0 | 100/0 | 26/74 | 81/19 | 70/30 | 77/23 | 60/40 |
| Specific surface | m²/g | 93 | 104 | 71 | 134 | 19 | 101 | 66 | 101 | 76 |
| Average diameters | | | | | | | | | | |
| Primary particles | nm | 10.10 | 9.82 | 12.80 | 6.88 | 40.05 | 10.01 | 28.07 | 12.54 | 25.12 |
| Aggregates | nm | 40.40 | 37.39 | 46.40 | 30.20 | 5.04/87.84 | 10.01/106.02 | 8.60/93.80 | 10.10/87.50 | 8.06/90.20 |
| Sodium | ppm | 53 | 58 | 53 | 50 | 49 | 50 | 52 | 48 | 51 |
| Carbon | wt. % | 0.03 | 0.05 | 0.03 | 0.01 | 0.4 | 0.12 | 2.06 | 1.08 | 0.51 |
| Mesopore volume | ml/g | 0.55 | 0.48 | 0.54 | n.d. | 0.05 | n.d. | n.d. | n.d. | n.d. |
| Tamped density | g/l | 100 | 87 | 105 | 80 | 1098 | 706 | 560 | 406 | 620 |
| Specific density | g/cm³ | 6.69 | 6.18 | 6.58 | n.d. | n.d. | 6.5 | 6.55 | 6.4 | 6.45 |
| pH value[b] | | 4.58 | 4.72 | 4.56 | 6.5 | 3.51 | 4.6 | 4.8 | 4.6 | 5 |

[a] XRD phase: cubic;
[b] as 4% solution;
n.d. = not determined

The examples relating to the production of the cerium oxide powders show that a powder according to the invention, which is free of coarse portions, can only be obtained within narrow limits. The powders P1 to P4 according to the invention are free of coarse portions and have average primary particle diameters of between 6.88 nm and 12.80 nm and average aggregate diameters of between 30.20 nm and 46.40 nm.

In Example 5, a mixture of coarse and fine-particle cerium oxide, which is not according to the invention, is obtained. The parameter lambda, the velocity of the aerosol droplets and the velocity in the reaction chamber lie outside the values claimed.

In Example 6, too, a cerium oxide powder consisting of a coarse and a fine portion, which is not according to the invention, is formed. Although all the process parameters, with the exception of the secondary air, lie within the ranges claimed, no powder according to the invention is obtained.

In Example 7, the lambda value, as well as the velocity of the aerosol droplets and the velocity of the reaction mixture in the reaction chamber, is outside the claimed range. In this case, in addition to a coarse portion of cerium oxide powder, a high proportion of carbon was also found.

In Example 8, too high a lambda value and in Example 9, too coarse a droplet distribution lead to a product which is not according to the invention.

The powders P1 to P4 according to the invention have a stoichiometry $CeO_{1.8}$ on their surface, determined by XPS analysis.

Furthermore, it was found that the powders P1 to P4 according to the invention have sodium contents of less than 10 ppm on their surface.

FIGS. 2 and 3 show the narrow distribution of the diameters of the primary particles and of the projected aggregate diameters using the example of powder 2.

The cerium oxide powders according to the invention can be readily dispersed and, even with a low energy input, yield average aggregate diameters of less than 200 nm.

This application is based on German Patent Application No. 103 37 199.0, filed on Aug. 13, 2003, and incorporated herein by reference in its entirety.

The invention claimed is:

1. A polycrystalline cerium oxide powder in the form of aggregates of primary particles, which has a specific surface of between 70 and 150 m²/g and an average particle diameter and an average, projected aggregate diameter within the following values only:
   an average primary particle diameter of 5 to 20 nm, and
   an average, projected aggregate diameter of 20 to 100 nm.

2. The cerium oxide powder of claim 1, wherein the specific surface is between 90 and 120 m²/g.

3. The cerium oxide powder of claim 1, wherein the average, number-based primary particle diameter is between 8 and 15 nm.

4. The cerium oxide powder of claim 1, wherein the average, projected aggregate diameter is between 30 and 70 nm.

5. The cerium oxide powder of claim 1, wherein at least 68% of the primary particle diameters lie within a range of between 0.6 m and 1.4 m, where m is the average primary particle diameter.

6. The cerium oxide powder of claim 1, wherein at least 68% of the projected aggregate diameters lie within a range of between 0.6 m and 1.4 m, where m is the average projected aggregate diameter.

7. The cerium oxide powder of claim 1, wherein at least 70% of the aggregates have an area of less than 1500 nm².

8. The cerium oxide powder of claim 1, wherein at least 85% of the aggregates have an area of less than 4500 nm².

9. The cerium oxide powder of claim 1, which has a $CeO_x$ composition on the surface of $1.5<x<2$.

10. The cerium oxide powder of claim 1, wherein it has a total sodium content of less than 500 ppm.

11. The cerium oxide powder of claim 10, wherein the sodium content on the surface is less than 10 ppm.

12. The cerium oxide powder of claim 1, which has a carbon content of less than 0.1 wt. %.

13. The cerium oxide powder of claim 1, which has a mesopore volume of 0.4 to 0.6 ml/g.

14. The cerium oxide powder of claim 1, which has a monomodal mesopore size distribution.

15. A process for the production of the cerium oxide powder of claim 1, comprising reacting an aerosol comprising a cerium compound that can be converted to cerium oxide by oxidation in a flame burning in a reaction chamber to produce a solid and then separating the solid from gaseous substances, to obtain the cerium oxide powder of claim 1.

16. A process for the production of the cerium oxide powder of claim 1, comprising reacting an aerosol in a flame burning in a reaction chamber to produce a solid and then separating the solid from gaseous substances, to obtain the cerium oxide powder of claim 1,
   wherein
   the aerosol is produced from an atomizer gas and a solution containing between 2 and 40 wt. % of a cerium compound that can be converted to cerium oxide by oxidation,
   the flame is obtained from a hydrogen-containing combustible gas and primary air,
   at least the same quantity of secondary air as primary air is introduced into the reaction chamber,
   the discharge velocity of the liquid droplets from the atomizer unit into the reaction chamber is greater than 500 m/s, and
   the velocity of the reaction mixture in the reaction chamber is greater than 2 m/s.

17. The process of claim 16, wherein the value lambda is $1.1 \leq \text{lambda} \leq 1.5$, wherein lambda is the quotient of the sum of the proportion of oxygen in the primary air, the secondary air and the atomizer gas, if it contains oxygen, divided by the sum of the cerium compound to be oxidized and the hydrogen-containing combustible gas, each in mol/h.

18. The process of claim 16, wherein the atomizer gas is air.

19. The process of claim 16, wherein the solution contains between 5 and 25 wt. % of a cerium compound.

20. The process of claim 16, wherein the solution from which the aerosol is obtained is organic.

21. The process of claim 16, wherein the cerium compound is an organic compound.

22. The process of claim 16, wherein the aerosol is produced by an ultrasonic atomization or at least one multi-substance nozzle.

23. The process of claim 16, wherein lambda is between 1.2 and 1.5.

24. The process of claim 16, wherein the quantity of secondary air is twice as high as that of primary air.

25. The process of claim 16, wherein a restrictor is installed in the reaction chamber.

26. The process of claim 16, wherein the reaction mixture is cooled to a temperature of 100 to 200° C. after leaving the reaction chamber.

27. The process of claim 16, wherein the separation of the solid takes place using filters at temperatures of between 100 and 200° C.

28. The process of claim 15, wherein the temperature in the reaction chamber, measured 0.5 m below the flame, is between 1000° C. and 1400° C.

29. A polishing agent comprising the cerium oxide of claim 1.

30. A heat-stabilized silicone rubber composition, comprising a silicone rubber and a heat-stabilizing effective amount of the cerium oxide of claim 1.

31. A dispersion containing the cerium oxide powder of claim 1.

32. The dispersion of claim 31, wherein the cerium oxide powder has an average aggregate diameter $d50$ in the dispersion of less than 200 nm.

33. The dispersion of claim 31, wherein at least 90% of the aggregates in the dispersion have an aggregate diameter of between 200 and 300 nm.

34. The dispersion of claim 31, wherein no aggregates in the dispersion have an aggregate diameter of more than 500 nm.

35. The dispersion of claim 31, wherein the content of cerium oxide is between 2 and 20 wt. %.

36. The dispersion of claim 31, wherein it contains at least one dispersant.

37. The dispersion of claim 36, wherein the dispersant is selected from the group consisting of water-soluble, organic polymers, the water-soluble, anionic, surface-active substances, the water-soluble, non-ionic, surface-active substances and water-soluble amines.

38. The dispersion of claim 31, wherein the proportion of dispersant is between 0.1 and 50 wt. %, based on cerium oxide.

39. The dispersion of claim 31, which has an alkaline pH.

40. A process for the production of the dispersion of claim 31, wherein the cerium oxide powder is pre-dispersed and then dispersed in a liquid medium, with dispersants and pH-regulating substances optionally being initially present in the liquid medium before the pre-dispersing or being added during the dispersing.

41. A method of polishing oxidic and metallic layers comprising applying the dispersion of claim 31 to an oxidic layer or a metallic layer.

* * * * *